Feb. 4, 1958 — E. M. GREER — 2,822,094
BRIDGE MANIPULATOR
Filed Sept. 29, 1953 — 6 Sheets-Sheet 1
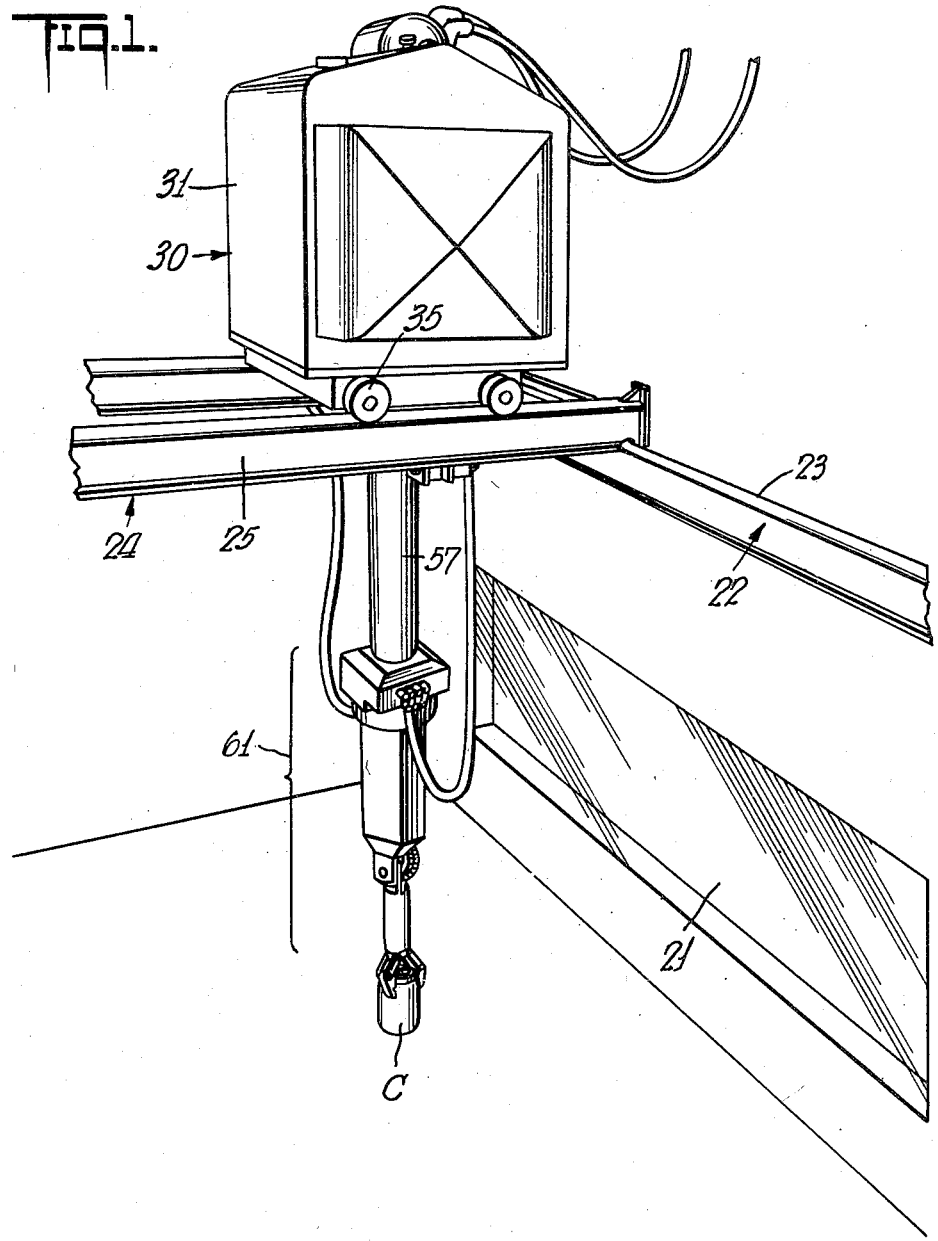
INVENTOR.
Edward M. Greer
BY Dean Fairbank + Hirsch
ATTORNEYS Feb. 4, 1958  E. M. GREER  2,822,094
BRIDGE MANIPULATOR
Filed Sept. 29, 1953  6 Sheets-Sheet 2
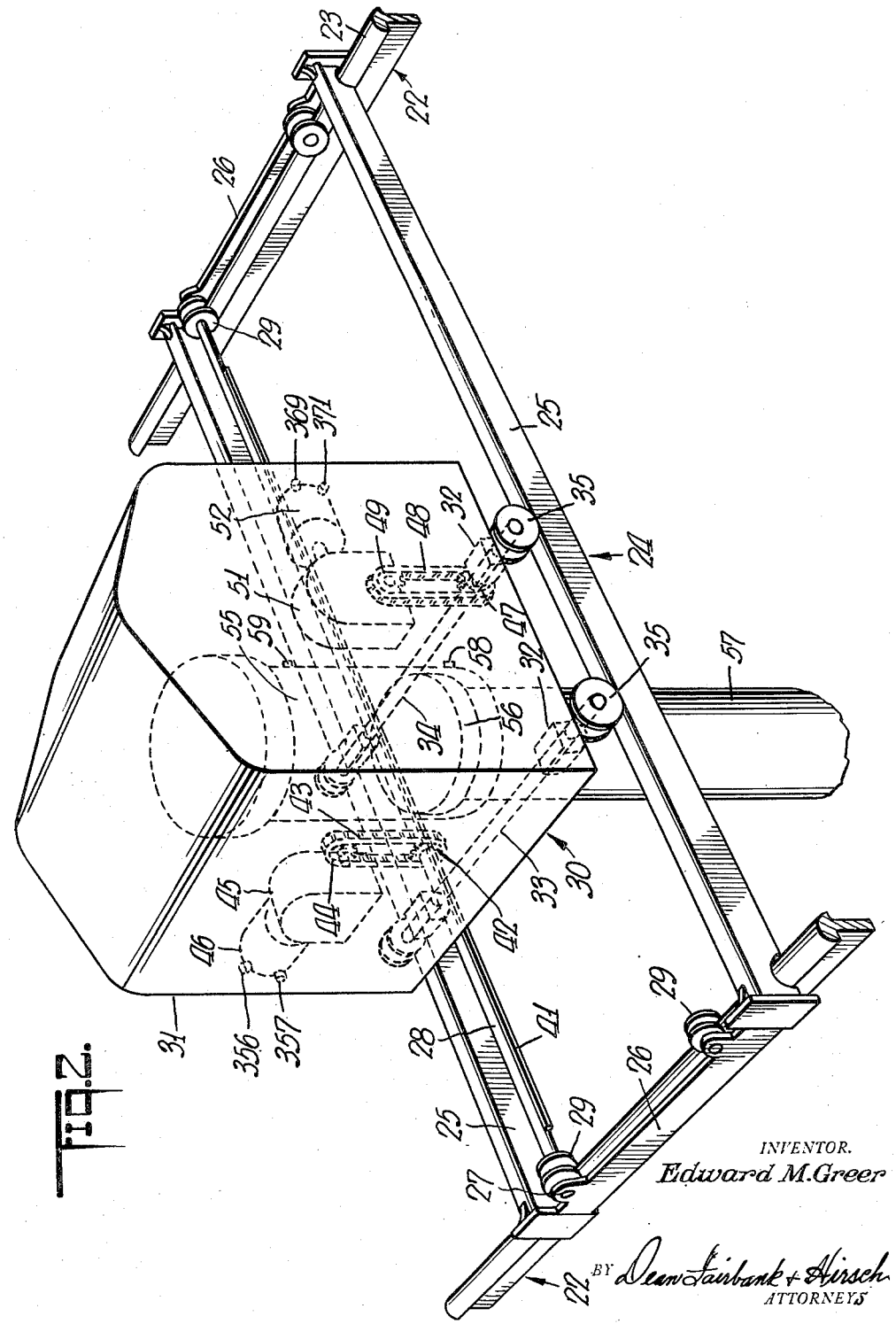
INVENTOR.
Edward M. Greer
BY Dean Fairbank + Hirsch
ATTORNEYS

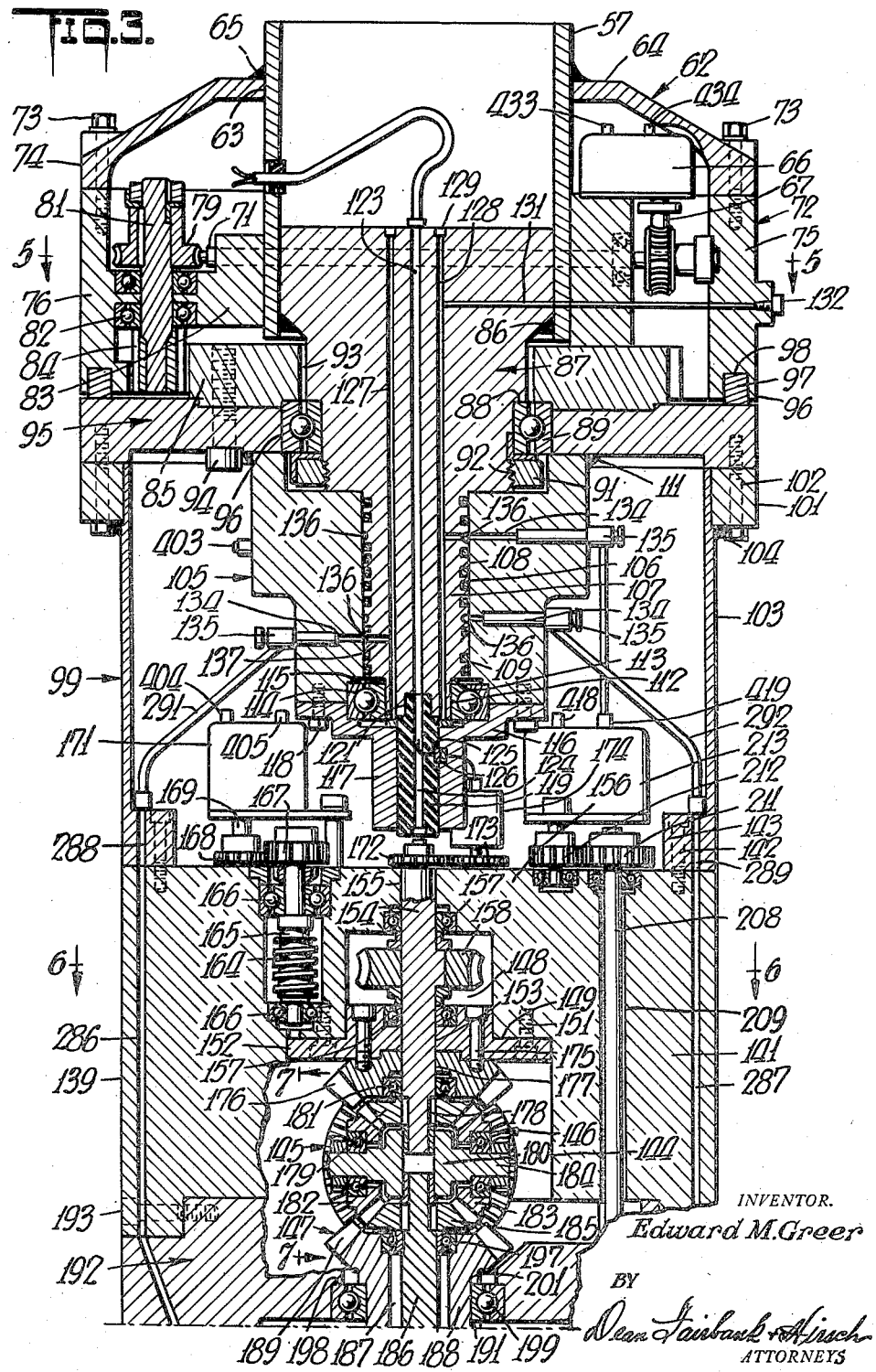

Feb. 4, 1958 E. M. GREER 2,822,094
BRIDGE MANIPULATOR
Filed Sept. 29, 1953 6 Sheets-Sheet 4
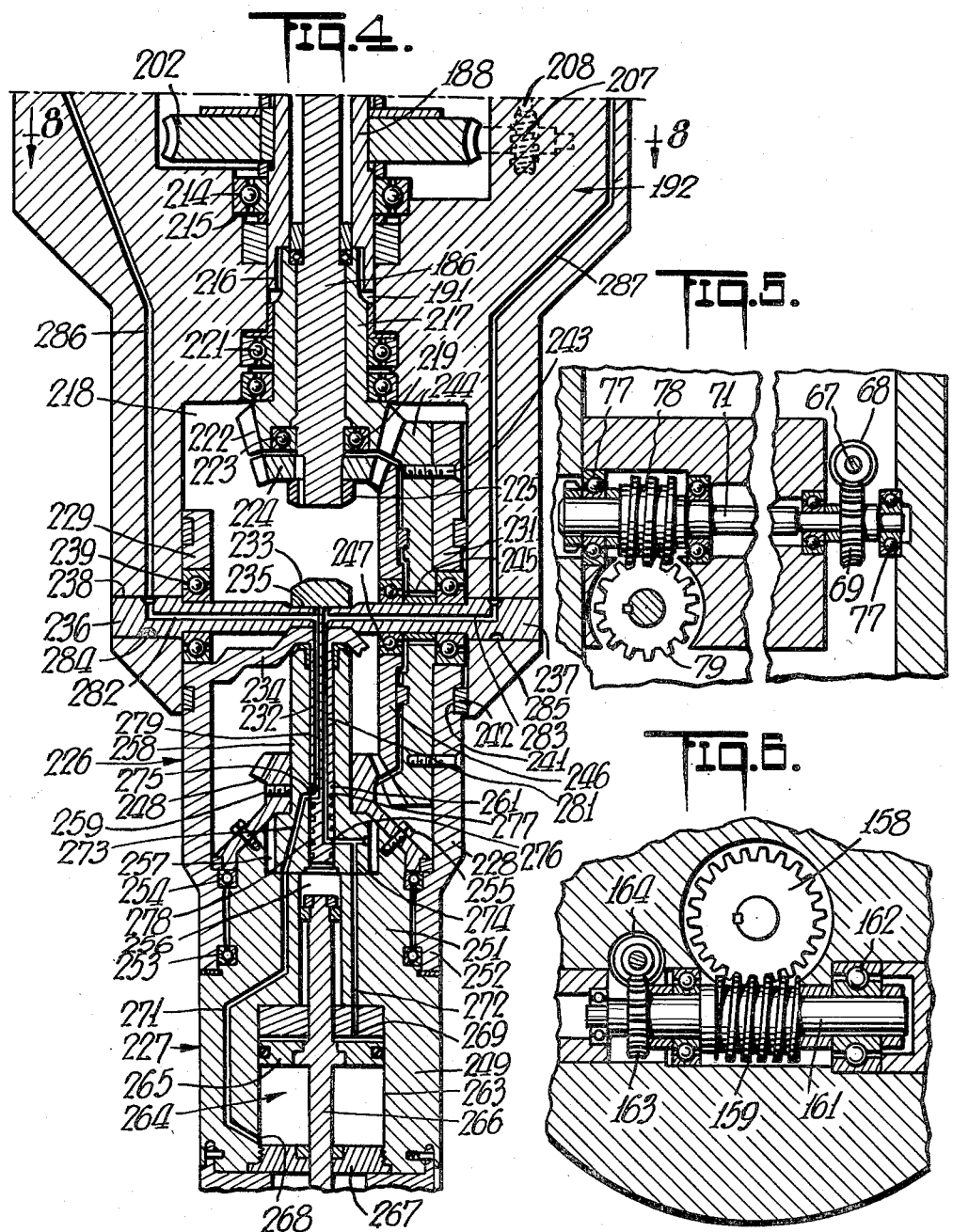
INVENTOR.
Edward M. Greer
BY Dean Fairbank & Hirsch
ATTORNEYS

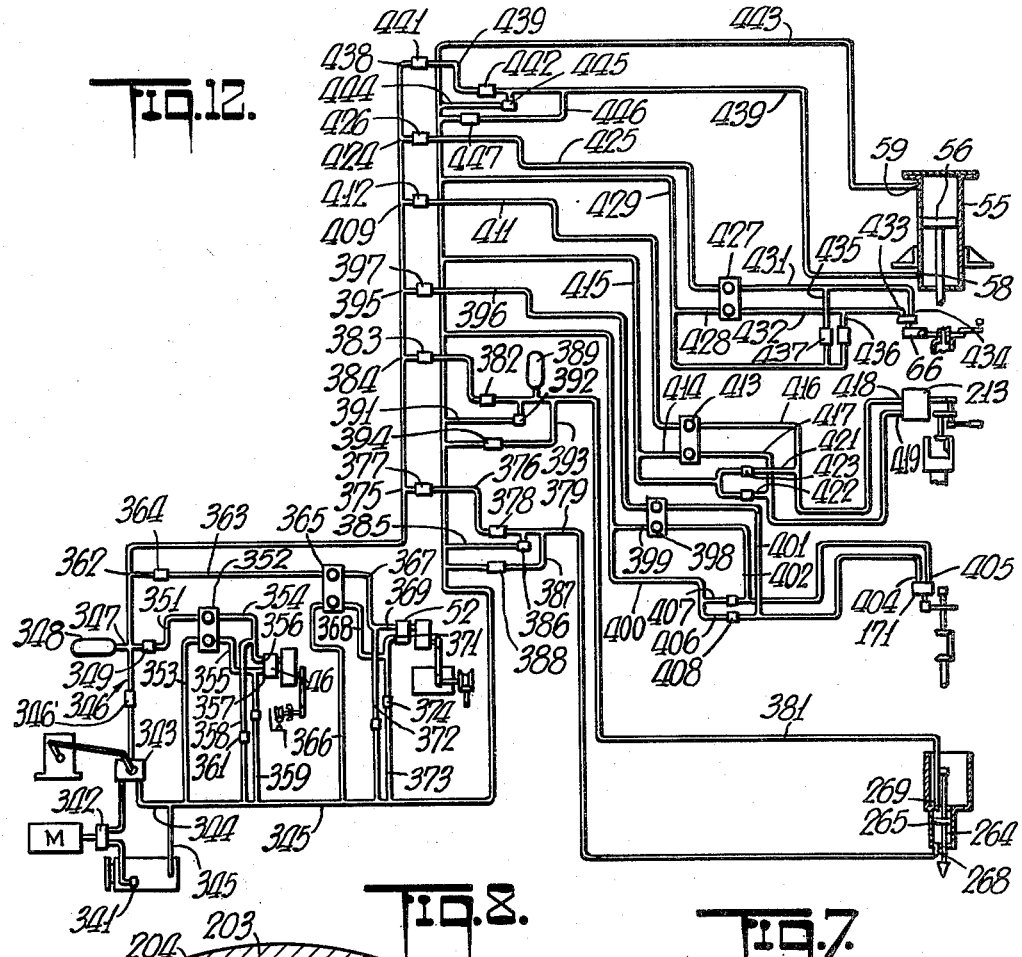

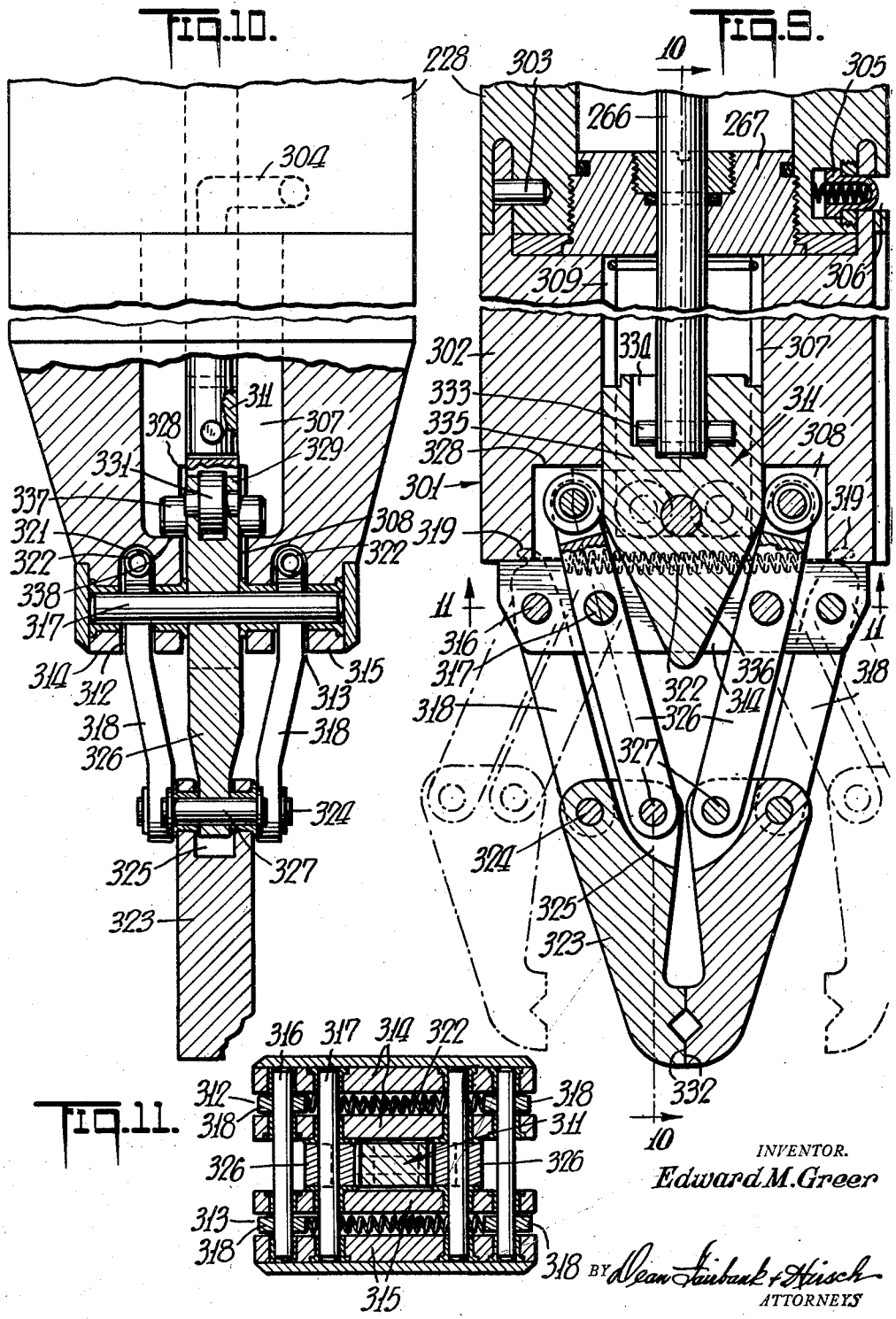

United States Patent Office 2,822,094
Patented Feb. 4, 1958

2,822,094

BRIDGE MANIPULATOR

Edward M. Greer, Great Neck, N. Y., assignor to Greer Hydraulics, Inc., a corporation of New York Application September 29, 1953, Serial No. 383,005

12 Claims. (Cl. 212—127)

This invention relates to the art of material handling equipment, and more particularly to an equipment for the remote handling and performing of complex operations on radioactive and highly toxic materials and dangerous chemicals.

Where materials of the above type are to be handled or operations are to be performed thereon, it is essential that the operator remain safe in a protected area, yet be able to perform at a remote position, many different motions with complete flexibility, so that complex operations involving many different steps may be completed. It is further essential that objects of weights extending over a wide range may be moved up, down, sideways and pin-pointed upon any given working area.

Where any one or more of the motions involved has an effect on another motion or causes another motion to occur, delicate handling is not possible nor can precision work be accomplished. Furthermore, unless the moving portions of the equipment can be dependably stopped at a desired place without possibility of creeping or slight motion, the equipment also will be relatively useless for precision work.

It is accordingly among the objects of the invention to provide an equipment of the above type which will permit the working tool to be pin-pointed upon any given working area and which is capable of universal motion in all directions without any one motion having any effect on another motion or producing another motion, which is able to handle materials of a wide range of weights and which is dependable in operation, and not likely to become deranged even after long use and may readily be operated from a remote position by an operator.

According to the invention from its broader aspect, the equipment includes a trolley capable of transverse and longitudinal motion on suitable tracks positioned above the working area and which desirably carries a reciprocable member or ram. Mounted at the lower end of the ram is an arm which, through suitable drive mechanism may be rotated in either direction, 360 degrees continuously. Pivotally mounted at the end of the arm is an elbow member which may be rotated about its pivot. At the extremity of the elbow member is a rotatable wrist member which is capable of 360 degrees continuous rotation on an axis at right angles to the pivotal axis of the elbow member. Desirably, means are provided to prevent interaction between the elbow and wrist members and to this end a double differential system is desirably used. The wrist member has a mount for a suitable tool which in the illustrative embodiment may be a clamp member for gripping the work to be performed, and a reciprocable piston rod is desirably provided in the wrist member for operating the clamp member.

All of the motions above described may be controlled by an operator from a position remote from the unit, desirably to the front of a wall or partition having a transparent window through which the work being performed may be viewed.

In the accompanying drawings in which is shown one or more of various possible embodiments of the several features of the invention, Fig. 1 is a diagrammatic perspective view of the equipment, Fig. 2 is a diagrammatic perspective view of the bridge and trolley, Figs. 3 and 4 are longitudinal sectional views of the manipulator, Fig. 5 is a fragmentary transverse sectional view taken along line 5—5 of Fig. 3, Fig. 6 is a view similar to Fig. 5 taken along line 6—6 of Fig. 3, Fig. 7 is a longitudinal sectional view taken along line 7—7 of Fig. 3, Fig. 8 is a transverse sectional view taken along line 8—8 of Fig. 4, Fig. 9 is a longitudinal sectional view of the lower end of the manipulator with a clamp member attached thereto, Fig. 10 is a longitudinal sectional view taken along line 10—10 of Fig. 9, Fig. 11 is a transverse sectional view taken along line 11—11 of Fig. 9, and Fig. 12 is a diagrammatic view of the hydraulic circuit.

Referring now to Figs. 1 and 2 of the drawings, in the illustrative embodiment herein shown the equipment is positioned in a room or chamber which desirably has a window 21 to permit the operator to see the object on which work is to be performed.

Mounted along each of the side walls of the chamber and spaced from the floor are a pair of parallel rails 22 which desirably have rounded upper edges 23. The rails 22 support a bridge 24 which, as shown in Fig. 2, may comprise a substantially rectangular frame having spaced parallel side beams or rails 25, the upper edges of each of which is also desirably rounded. The rails 25 extend across the entire width of the chamber and a transverse beam 26 is positioned at each end of the pair of rails 25 rigidly to connect the latter together, said beams having upstanding ears 27 desirably formed integral therewith near each end thereof.

Extending parallel to and positioned adjacent one of the rails 25 is a bridge drive shaft 28, the ends of which are journalled in suitable bearings mounted in an associated pair of ears 27. Affixed to said shaft 28 near each of its ends respectively is a wheel 29, desirably a V groove wheel and a second pair of V groove wheels 29 are rotatably mounted respectively on suitable stud shafts mounted on the other pair of ears 27. Thus, the wheels 29 serve to mount the bridge 24 on the rails 22 so that it may be moved from one end of the chamber to the other.

The rails 25 serve to mount a trolley 30 which includes a housing 31, to the undersurface of which are affixed two pairs of bearing blocks 32. Rotatably mounted in each transversely aligned pair of bearing blocks 32 are shafts 33 and 34 which mount at each end a V groove wheel 35 which rides on the rails 25 so that the trolley may be moved along the bridge from one side of the chamber to the other.

Means are provided to rotate the bridge drive shaft 28 to move the bridge 24 along the rails 22 and to rotate the trolley drive shaft 34 to move the trolley 30 along the bridge rails 25. Although any suitable drive means may be utilized, in the embodiment herein shown, the bridge drive shaft 28 desirably is splined along its length as at 41 and slidably mounts a gear 42 which is connected through a drive belt 43 to a gear 44 mounted on the output shaft of a speed reducer unit 45, the input shaft of which is desirably driven by a hydraulic motor 46. The hydraulic motor 46, the speed reducer 45 and the gears 43 and 42 are rigidly mounted in said housing 31 so as to move therewith, so that when said trolley 30 is moved along the rails 25, the gear 42 will slide along shaft 28.

In order to effect movement of the trolley 30, a gear 47 is affixed to the trolley drive shaft 34 and is connected through a drive belt 48 to a gear 49 mounted on the output shaft of a second speed reducer unit 51, the input shaft of which is also desirably driven by a hydraulic motor 52, the hydraulic motor 52 and the speed reducer unit 51 also being rigidly mounted in said housing 31.

Mounted in vertical position in the housing 31 is an elongated hydraulic cylinder 55 which has a piston 56 slidably mounted therein to which is affixed one end of a piston rod or ram 57 extending through the lower end of the cylinder 55 beneath the bridge 24. The cylinder 55 has a fluid input port 58 adjacent its lower end and a discharge port 59 near its upper end connected to the hydraulic circuit hereinafter to be described.

The piston rod 57 which illustratively is tubular, mounts at its lower end, the manipulator unit 61 as is clearly shown in Figs. 1 and 3.

In the illustrative embodiment shown in Fig. 3 of the drawings, the manipulator unit 61 comprises an inverted substantially cup-shaped support or housing 62 which has a central opening 63 in its top wall 64 through which the lower end of the piston rod or hydraulic ram 57 extends, such lower end being affixed to the wall 64 as by welding as at 65. Mounted in the housing 62 is a motor 66, desirably a hydraulic motor, the shaft 67 of which, as shown in Figs. 3 and 5, mounts a worm 68 which meshes with a worm gear 69 affixed on a shaft 71 extending transversely across a rectangular frame 72 affixed as by screws 73 to the rim 74 of the housing 62. The shaft extends between the opposed walls 75 and 76 of the frame 74 and is rotatably mounted in suitable bearings 77. The end of shaft 71 adjacent wall 76 mounts a worm 78 which meshes with a worm gear 79 affixed on a vertical shaft 81 rotatably mounted in suitable bearings 82 positioned in a lateral flange 83 preferably formed integral with the wall 76 of the frame. The lower end of shaft 81 mounts a pinion 84 which meshes with a gear 85.

As shown in Fig. 3, the lower end of the tubular piston rod 57 has positioned therein and rigidly affixed thereto as at 86 as by welding, a substantially cylindrical extension 87 which has an annular shoulder 88 against which is seated the inner race of a bearing 89, said bearing being securely retained against said shoulder by means of a nut 91 screwed on a threaded portion 92 of said cylindrical extension beneath said annular shoulder. The cylindrical extension 87 extends through a central opening 93 in gear 85 and said gear 85 rests on the outer race of said bearing 89 so that said gear may rotate with respect to said cylindrical extension. Affixed to the undersurface of gear 85 as by screws 94, is a disc 95 having a central opening 96, the wall of which may abut against the outer race of bearing 89. The periphery of disc 95 is desirably aligned with the lower end or rim 96 of the frame 72 and a washer 97 is positioned in an annular groove 98 in said rim 96 to provide a seal between such rim and the disc 95.

The disc 95 serves as the rotatable mount for the upper arm 99 of the unit. To this end, in the illustrative embodiment herein shown, a collar 101 is affixed as by screws 102 to the undersurface of the periphery of disc 95 and a sleeve 103 extends into the collar as is clearly shown in Fig. 3 and is affixed thereto as by welding as at 104. Positioned in said sleeve 103 is a cylindrical manifold member 105 which serves to connect hydraulic fluid to various portions of the unit from a source of fluid under pressure.

As is shown in Fig. 3, the manifold member desirably has a longitudinal axial bore 106 through which extends the reduced lower portion 107 of the cylindrical extension 87. The reduced lower portion desirably has a plurality of annular grooves 108 longitudinally spaced therearound in each of which is positioned a resilient seal member such as an O ring 109 which provides a seal between the outer surface of said reduced diameter portion 107 and the wall of the bore 106 in said manifold member 105. The manifold member is affixed to the disc 95 as by welding as at 111 at its upper end so that said manifold member may rotate around the reduced diameter portion 107 of the cylindrical extension 87.

Desirably, the lower end of the reduced diameter portion 107 has a further reduced portion 112 defining an annular shoulder 113 against which is seated the inner race of a bearing 114, the outer race of said bearing serving as the seat for an annular shoulder 115 formed at the lower end of said manifold member 105. The bearing 114 is desirably retained in position by means of a clamp plate 116 which desirably has a tubular nipple 117 depending therefrom, the clamp plate being affixed to the manifold member 105 as by screws 118. Positioned in the bore of said nipple 117 is a tubular plug 119 of insulating material which desirably is affixed as at 121 in the lower end of the reduced diameter portion 107 of the cylindrical extension 87, the plug 119 being free to rotate in said nipple 117.

As shown in Fig. 3, the cylindrical extension 87 desirably has an axial bore 123 therethrough aligned with an axial bore 124 in the plug 119 which serves as a conduit for electrical wires, the function of which will be hereinafter described. Each of the wires, one of which is illustratively shown, which extend through the conduit is connected to a conducting member 125 on the outer periphery of the plug which slidingly engages a corresponding conducting member 126 affixed in the nipple 117 and insulated therefrom, each of said conducting members 126 having a wire connected thereto.

The cylindrical extension 87 also has a plurality of longitudinal bores therethrough, two of which are illustratively shown, designated by the numerals 127, 128, each of which is closed at both ends as at 129 and which are arranged in a circle around the axial conduit or bore 123. Each of the bores 127, 128, etc. is connected by a line 131 extending transversely through the side wall 75 of the frame 72 to an associated port 132 to which the hydraulic fluid supply may be connected. In Fig. 3 only one of the lines 131 is shown, it being understood that similar lines 131 are connected to each of the longitudinal bores 127, 128, etc.

The manifold 105 has a plurality of transverse passageways or bores 134, the outer end of each of the bores having a port 136 for connection to a hydraulic unit to be operated. The inner end of each of the transverse bores 134 is aligned with a corresponding annular groove 136 around the periphery of the reduced diameter portion of the cylindrical extension between two adjacent O rings 109, a transverse bore 137 being connected at its outer end to the associated annular groove 136 and at its inner end to an associated bore 127, 128, etc.

The lower end of the sleeve 103 carries the intermediate portion 139 of the upper arm of the unit. In the illustrative embodiment such intermediate portion desirably comprises a cylindrical block 141 which is affixed at its upper end as by screws 142 to an internal annular flange 143 formed integral with the lower end of the sleeve 103. The block 141 desirably has a central cavity 144 therein in which is positioned a double differential system 145 comprising an inner differential unit 146 and an outer differential unit 147.

Positioned above the cavity 144 is a cylindrical recess 148 of smaller diameter than the cavity 144 defining an annular shoulder 149 to which is affixed as by screws 151 the periphery of a retaining plate 152. The plate 152 has an axial bore 153 through which extends a vertical shaft 154, said shaft extending through a reduced diameter bore 155 in the top wall 156 of the block 141 and being rotatably mounted in bearings 157 in said top wall 156 and in the retaining plate 152. Affixed to the shaft 154 between the plate 152 and the wall 156 is a worm gear 158 which, as shown in Fig. 6, meshes with a worm 159 affixed on a shaft 161 rotatably mounted in the block 141 in suitable bearings 162 and having affixed at one end a worm gear 163. The worm gear 163 is engaged by a worm 164 affixed on a vertical shaft 165 laterally displaced from shaft 154 and rotatably mounted in suitable bearings 166 in block 141. The upper end of the shaft 165 which extends beyond the top surface of block 141 mounts a gear 167 which is engaged by a pinion 168 affixed on the shaft 169 of a hydraulic motor 171 rigidly mounted in the sleeve 103. Thus, upon rotation of the shaft 165 through the transmission above described, the shaft 154 will also rotate, and such shaft at its upper end has a pinion 172 affixed thereon which meshes with a gear 173 affixed on the drive shaft of a Selsyn transmitter 174 of conventional type, the output leads of which are connected to associated conducting members 126 so that a receiving Selsyn (not shown) at the remote control position at which the operator is stationed will be to see by means of a suitable indicator connected to the receiving Selsyn just how much rotation has been imparted to the shaft 154.

Affixed to the retaining plate 152 as by screws 175 is a gear 176 which forms one of the elements of the outer differential unit 147, said gear 176 having a central opening 177 through which the lower end of shaft 154 extends. Affixed to such lower end as by key 178 is a gear 179 which forms one of the elements of the inner differential unit 146. Desirably a bearing 181 is interposed between the gears 176 and 179 so that the gear 179 may rotate freely with respect to the gear 176 upon the drive imparted thereby by shaft 154. The gear 179 is engaged by two vertical transverse gears 182 and 183, rotatably mounted respectively on diametrically opposed stud shafts 184 which extend outwardly from a hub 180 which has an axial bore into which the lower end of shaft 154 extends and the gears 182 and 183 engage a horizontal gear 185 keyed to a vertical shaft 186, the upper end of which extends into the bore of hub 180.

The shaft 186 extends through the bore 187 of a vertical sleeve 188 which desirably has a gear conformation 189 formed integral therewith at its upper end. The sleeve is positioned in an axial bore 191 in a substantially cylindrical member 192 which forms the lower portion of the upper arm 99 of the unit, said member 192 being affixed at its upper portion to the bottom of block 141 as by transverse screws 193.

As is clearly shown in Fig. 7, the gears 176 and 189 are engaged by parallel vertical gears 194 and 195, said gears forming the outer differential unit 147, the gears 194, and 195 being rotatably mounted respectively on diametrically opposed stud shafts 196 which also extend outwardly from hub 180 each of the shafts 196 being spaced 90 degrees from a shaft 184.

As shown in Figs. 3 and 7, a bearing 197 is provided between the shaft 186 and the sleeve 188 for free relative motion therebetween. The sleeve 188 desirably has an annular shoulder 198 near its upper end which rests on the outer race of a bearing 199 which is securely retained in any suitable manner against an annular shoulder 201 in the lower portion 192 of the upper arm 99. As shown in Fig. 4, the sleeve 188 has affixed thereto as by keying below the bearing 199, a worm gear 202 which, as shown in Fig. 8, is engaged by a worm 203 affixed on a transverse shaft 204 rotatably mounted in suitable bearings 205. The shaft 204 at one end has a worm gear 206 affixed thereto engaged by a worm 207 affixed at the end of a vertical shaft 208 extending through a vertical bore 209 in said block 141 as is clearly shown in Fig. 3. The upper end of shaft 208, which extends above the surface of said block, has a gear 211 affixed thereon, engaged by a pinion 212 affixed on the drive shaft of a hydraulic motor 213. Thus, upon rotation of shaft 208 through the transmission above described, the sleeve 188 will be rotated.

In addition to the bearing 199, the sleeve 188 is also rotatably supported by a bearing 214 positioned beneath gear 202 as is shown in Fig. 4 and seated on an annular shoulder 215 in the lower portion 192 of the upper arm 99. The lower end of the sleeve 188 is splined as at 216 to the upper end of a sleeve 217 which extends at its lower end into a cavity 218 in said lower portion 192. The sleeve 217 is rotatably mounted with respect to the vertical shaft 186 by means of bearing 219 and the sleeve 217 is rotatably mounted with respect to the lower portion 192 by means of bearings 221. The lower end of sleeve 217 has a gear conformation 222, preferably formed integral therewith, and the shaft 186 extends beyond said gear 222, a bearing 223 being interposed between said shaft and said gear. The extending lower end of shaft 186 has a gear 224 affixed thereon and retained in position by means of a nut 225 screwed on the threaded end of said shaft 186.

The gear 222 serves to effect pivotal movement of the elbow 226 of the unit and the gear 224 serves to effect rotation of a wrist member 227 rotatably mounted at the lower end of the elbow. As is clearly shown in Fig. 4, the elbow 226 may comprise a tubular member 228 having a pair of arms 229 and 231 at its upper end, defining a yoke. The arms 229 and 231 extend into the recess or cavity 218 in the lower portion 192 of the upper arm and are mounted so that the elbow may pivot. To this end the elbow 226 desirably has an axial cylindrical rod 232 of enlarged diameter at its upper end as at 233 which is rigidly supported in the elbow by means of lateral struts 234, the arms 229 and 231 rising above said lateral struts. The enlarged upper end 233 of the rod 232 desirably has transversely aligned recesses 235 on each side into each of which extends the associated end of a pivot pin 236, 237, the pins being retained at their ends in transversely aligned openings 238 in the wall of the lower portion 192 of the upper arm. Each of the arms 229 and 231 has a bearing 239 which encompasses the associated pivot pin 236, 237 as is clearly shown in Fig. 4 so that the elbow 226 may pivot readily about said pivot pins. Desirably an annular groove 241 is provided in each of the outer surfaces of the arms 229 and 231 and a washer 242 is positioned in each annular groove to engage the associated wall of the groove cavity 218 to provide a seal.

Affixed to the arm 231 on its inner surface as by screws 243, is a vertical gear 244 which has a central opening 245 through which the pivot pin 237 extends. The gear 244 meshes with the gear 222 as is shown in Fig. 4, so that rotation of the gear 222 will effect pivoting of the elbow 226 about its pivot pins 236, 237.

Rotatably mounted on the pivot pin 237 is a second vertical gear 246 which has a bearing 247 to permit free rotation of such gear about such pivot pin. The gear 246 meshes with the gear 224 to be rotated thereby and also engages gear 248 to rotate the wrist member 227. As is clearly shown in Fig. 4, the wrist member comprises a substantially cylindrical block 249 of reduced diameter at its upper end as at 251 and affixed as by screws 255 to the gear 248. The reduced diameter portion 251 is positioned in the cylindrical lower end 252 of the elbow member 266, and is rotatably mounted with respect thereto by means of suitable bearings 253 and 254, the bearings preventing vertical displacement of said wrist member.

The wrist member 227 desirably has an axial bore 256 therethrough of enlarged diameter at its upper end as at 257 in which is positioned the lower end of a sleeve 258 which is rotatably mounted on the axial rod 232, said gear 248 being affixed to said sleeve 258 as by screws 259. Desirably the rod 232 has a plurality of longitudinally spaced annular grooves in which resilient O rings 261 are positioned to provide a seal between the rod and the sleeve. The bore 256 is also of enlarged diameter at its lower end as at 263, defining a piston chamber 264 in which a piston 265 is slidably mounted, said piston having a piston rod 266 affixed thereto and extending vertically downward therefrom through a closure plate 267 affixed in the lower end of the piston chamber 264.

Means are provided to reciprocate said piston 265. To this end the chamber 264 has ports 268 and 269 positioned on each side of the piston 265 and connected by passageways 271, 272 respectively in the wrist member to passageways 273 and 274 in the lower end of sleeve 258 which lead into associated ports 275, 276. The ports 275 and 276 are in communication respectively with annular grooves 277 and 278 in rod 232 and said annular grooves lead into longitudinal passageways 279 and 281 in said rod, the upper ends of said passageways being in communication respectively with axial passageways 282 and 283 in the pivot pins 236, 237 respectively. The passageways 282, 283 in the pivot pins lead into associated annular grooves 284 and 285 and such annular grooves are in communication with passageways 286 and 287 extending through the lower portion 192 of the upper arm (Fig. 4) and the intermediate portion of the upper arm (Fig. 3). The upper end of said passageways 286 and 287 are connected to passageways 288 and 289 in flange 143 of tubular member 103 which are connected by lines 291 and 292, respectively to associated ports 135. These ports are in communication through transverse passageways 134 in the manifold 105 with annular grooves 136 in the cylindrical extension 87 connected to an associated bore 127, 128, etc.

Although the piston rod 266 (Fig. 4) in the wrist member 227 may operate any suitable tool, in the illustrative embodiment herein shown, a clamping tool 301 is provided which is clearly shown in Figs. 9, 10 and 11.

The clamping tool 301 desirably has a substantially cylindrical body portion 302 and is removably affixed to the lower end of member 228 as is shown in Figs. 9 and 10, by any suitable means such as bayonet and slot connections 303, 304, a spring urged plunger 305 which may be released as by means of a pin pushed into an opening 306 in the wall of the wrist member 227 retaining the body portion 302 in locked position. As such construction is conventional it will not be further described.

The body portion 302 desirably has an axial bore 307 therethrough in communication at its lower end with an elongated rectangular recess 308 in the lower end of said body portion, the bore and the side walls of the recess having opposed elongated grooves 309 which define a track for an actuating member 311. In addition, the lower end of the body portion 302 on each side of the recess 308 and extending parallel thereto has elongated notches 312 and 313 which define two pairs of brackets 314 and 315.

Extending transversely through the pairs of brackets 314, 315 near each end thereof are pairs of pivot pins 316 and 317. Each pivot pin 316 mounts a pair of links 318, the upper ends of which are positioned between the associated pair of brackets and each of said links has a hook conformation 319 extending upwardly from said upper end, positioned in grooves 321 extending parallel to the notches 312 and 313. The hooks 319 in each of the grooves 321 are connected together by coil springs 322 which normally urge the lower ends of each pair of links 318 outwardly away from each other to the position shown in dot and dash lines in Fig. 9.

The lower ends of each pair of links 318 straddle the upper end of an associated clamp arm 323, being pivoted to such upper end as by transverse pin 324. The opposed inner surfaces of each of the clamp arms 323 on the inner surface is desirably bifurcated as at 325 and the lower end of a link 326 extends between each of such bifurcated portions and is pivoted thereto by a pin 327. The links 326 adjacent their upper ends extend into the recess 308 and are pivotally mounted on the pivot pins 317 as is clearly shown in the drawings. The upper ends of each of the links 326 which extends to nearly the top wall 328 of the recess is also bifurcated as at 329 (Fig. 10) and mounts a roller 331. By reason of the construction above described, the clamping jaws 332 at each end of the clamp arms 322 will remain parallel to each other regardless whether they are in closed position or are in open position, as is clearly shown in Fig. 9.

The actuating member 311 serves to move the clamp jaws 332 from their normally open position as shown in dot and dash lines in Fig. 9 to the closed position, and may comprise a plunger which is desirably affixed at its upper end to the lower end of piston rod 266 in any suitable manner such as by means of a bayonet slot connection 333, 334 of conventional type.

The actuating member 311 is substantially rectangular at its upper portion as at 335 and wedge shaped at its lower portion as at 336, and rides in the track defined by recesses 309 and when in its lowermost position determined by the abutment of pin 337 against shoulder 338 as shown in Figs. 9 and 10 the rollers 331 will rest against the opposed surfaces of the rectangular portion 335 to retain the clamp jaws 332 in fully closed position. When the actuating member 311 is lifted the rollers 331 will ride along the opposed inclined surfaces of the wedge shaped portion 336 being retained thereagainst by the coil springs 322 and the clamp jaws 332 will move to their open position shown in dot and dash lines in Fig. 9.

In the embodiment herein shown, the various moving elements of the manipulator 61 are controlled by the system diagrammatically shown in Fig. 2. This system comprises a fluid reservoir 341 connected to the inlet of a pump 342 which is driven by motor M. The outlet of the pump is connected to a flow control unit 343 which has a discharge line 344 connected to the main return line 345 which leads to the reservoir 341 so that based upon the setting of unit 343 a desired quantity of fluid will be delivered into line 346.

The outlet of the flow control unit 343 is connected by main feed line 346 through one-way valve 346' to junction 347, to which is connected a pressure accumulator 348 of conventional type such as that put out by Greer Hydraulics, Inc. of Brooklyn, New York. The accumulator 348 when the pump 342 is actuated, is designed to store fluid under pressure and serves to dampen pump pulsations and pressure surges, supplement the pump output at time of peak loads and compensate for small internal leakages through the circuit components, thus maintaining a constant pressure during operation. The junction 347 is connected through one-way valve 349 and line 351 to the inlet of a solenoid-operated valve 352, the valve having a discharge line 353 connected to the main return line 345 of the system and two control ports connected by lines 354 and 355 to the corresponding ports 356, 357 of the bridge drive motor 46 shown in Fig. 2. The lines 354 and 355 are also connected by relief lines 358 and 359 through relief valves 361 to the main return line 345. Connected to the main feed line 346 as at 362 is a line 363 which leads through one-way valve 364 to the inlet of a solenoid-operated valve 365. Valve 365 also has a discharge line 366 connected to the main return line 345 and has two control ports connected by lines 367 and 368 to the corresponding ports 369, 371 of the trolley drive motor 52 (Fig. 2), said lines 367 and 368 being connected by relief lines 372 and 373 through relief valves 374 to the main return line 345.

Connected to the main feed line 346 as at 375 is a line 376 which leads through one-way valve 377 to the inlet of solenoid operated valve 378 and thence through line 379 to the associated port 132 (Fig. 3) which is connected as previously described to port 268 (Fig. 4) of chamber 264. The port 269 of chamber 264 is connected to the associated port 132 and thence by line 381 through solenoid operated valve 382 and one-way valve 383 to main feed line 346 as at 384. Connected at one end to line 379 is a relief line 385 which is connected at its other end to main return line 345, the line 348 having a relief valve 386 therein. In addition, a discharge line 387 is connected to line 379 and leads through solenoid-operated valve 388 to the main return line 345. The line 381 may have a pressure accumulator 389 connected thereto to minimize pressure surges and to prevent pressure drop in the system due to small leakage past valves and seals and also has connected thereto a relief line 391 with a relief valve 392 therein and a discharge line 393 which has a solenoid-operated valve 394 therein, the lines 391 and 394 both being connected to main return line 345.

Connected to main feed line 346 as at 395 is a line 396 which leads through one-way valve 397 to the inlet of solenoid-operated valve 398. Valve 398 has a discharge line 399 which is connected through line 400 to the main return line 345 and has two control ports connected by lines 401, 402 to the associated ports 132 on the manipulator (Fig. 3) and thence through passageways 131 and associated bores 127, 128, etc. to the ports 404, 405 of hydraulic motor 171. Desirably, relief lines 406 and 407 are connected to lines 401 and 402 through relief valves 408 and such relief lines are connected to line 400.

Connected to main feed line 346 as at 409 is a line 411 which leads through one-way valve 412 to the inlet of solenoid-operated valve 413. Valve 413 has a discharge line 414 which is connected through line 415 to the main return line 345 and has two control ports connected by lines 416, 417 to the associated ports 132 on the manipulator (Fig. 3) and thence through passageways 131 and associated bores 127, 128, etc. to the ports 418, 419 of hydraulic motor 213. Desirably, relief lines 421 and 422 are connected to lines 416, 417 through relief valves 423 and such relief lines are connected to line 415. Connected to the main feed line 346 as at 424 is a line 425 which leads through one-way valve 426 to the inlet of solenoid-actuated valve 427. Valve 427 has a discharge line 428 which is connected through line 429 to the main return line 345 and has two control ports connected by lines 431, 432 to the associated ports 433, 434 of hydraulic motor 66. Desirably, relief lines 435 and 436 are connected to lines 431, 432 through relief valves 437 and such relief lines are connected line 429.

Connected to the main feed line 346 as at 438 is a line 439 which leads through one-way valve 441 and solenoid-operated valve 442 to the port 58 in the main hydraulic cylinder 55, the port 59 of said cylinder being connected by line 443 to the return line 345.

A relief line 444 is connected to line 439 and leads through relief valve 445 to return line 345 and a discharge line 446 also connected to line 439 leads through solenoid-operated valve 447 to said return line 345.

The solenoid-operated valves 352, 365, 398, 413 and 427 are arranged so that when one of the two associated push buttons is pressed, fluid will flow from the main feed line 346 through the valve into one of the ports of the associated motor and out of the other port of the motor through the valve to the return line 345. The solenoid-operated valves 378, 394 are arranged to work simultaneously as are valves 382, 388. Thus, fluid will flow from the main feed line 346 through valve 378 into port 268 of chamber 264 and from port 269 through valve 394 to the return line 345 to raise the piston 265. Similarly, fluid will flow from the main feed line 346, through valve 382, into port 269 of chamber 264 and from port 268 through valve 388 to the return line 345 to lower piston 265.

When the solenoid-operated valve 442 is actuated, valve 447 will remain closed and fluid will flow from the main feed line 346 into port 58 of main cylinder 55 to raise the piston therein. When valve 447 is actuated, valve 442 will remain closed and fluid will flow from port 58 of cylinder 55 through the valve 447 to the return line so that the piston 56 will be lowered due to the weight of the manipulator unit.

In the illustrative embodiment herein shown, a single indicating device such as a Selsyn transmitter 174 (Fig. 3) has been shown which serves to indicate at a remote position through suitable equipment the amount of movement of wrist member 227 by motor 171. Similar units may be associated with the motors 66 and 213 to indicate the amount of movement of the manipulator unit by motor 66 and of the elbow 226 by motor 213.

Similarly, suitable indication transmitters may be associated with the pistons 56 in the main cylinder and the piston 265 which operates the clamp jaws to indicate at a remote position, the extent of the vertical movement of piston rod 57 and the movement of the clamp jaws 332.

As such indication transmitters are well known in the art and per se form no part of the invention, they will not be further described.

*Operation*

The equipment above described is especially designed for use in the handling of radioactive materials or the like, which requires that the operator be located at a position remote from the object on which work is to be performed and separated therefrom by a suitable barrier or safety wall. A control unit is provided, desirably located on the outside of the safety wall which has a window or other viewing means to permit the operator to see the work being performed at all times. The control unit contains the switches for operating the solenoid valves to effect the various motions required and the devices to indicate the extent of such motions. The control unit is desirably mounted on a rail so that it may be moved along the length of the window, to permit the operator to be directly in front of the object on which the manipulator is to work.

As the control unit may be of any suitable type and includes a plurality of switches, relays, meters and the like, the construction of which would be readily apparent to one skilled in the art, it will not be shown or described.

Referring to Fig. 1, assuming that the object on which work is to be performed is a container C positioned in the chamber, the equipment may be operated in the following manner.

The motor M (Fig. 12) is energized to actuate pump 342 so that fluid will flow from reservoir 341 through the main feed line 346 into accumulators 348 and 389 to charge such accumulators.

The operator may then move the bridge 24 shown in Figs. 1 and 2 so that it extends transversely over the container. To effect such movement the solenoid operated valve 352 is actuated so that fluid will flow from the feed line 346 into the hydraulic motor 46 to actuate the latter. As a result the gear 42 (Fig. 2) on splined bridge shaft 28 will rotate to effect movement of the bridge along the rails 22 in the desired direction, depending upon which of the control buttons of the valve 352 is actuated. When the bridge has reached the desired position, the control button of valve 352 is released and the movement of the bridge will cease. As the speed reducer 45 associated with the hydraulic motor 46 has worm and worm gear transmissions, there will be no back-lash or play, and by reason of the use of the hydraulic motor, substantially instantaneous starting and stopping may be effected, thereby providing precise positioning of the bridge.

In a similar manner, after the bridge is positioned above the object, the trolley 30 may be moved along the bridge 24 so that the manipulator unit 61 will be positioned directly above the container C. Such movement is effected by the actuation of the corresponding push button of solenoid-operated valve 365 so that fluid will flow from feed line 346 into hydraulic motor 52 to rotate the gear 47 and shaft 34, thereby causing movement of the trolley along the bridge. By reason of the splined shaft 28 when the trolley moves along the length of the bridge, the gear 42 will slide along the shaft 28, thereby in no way preventing movement of the trolley. It is of course to be understood that the bridge and trolley can be moved in either direction, depending upon which of the push buttons of the associated valve 352 or 365 is actuated.

The next step in the operation is to lower the manipulator unit 61 so that the clamp jaws 332 at the lower end thereof may engage the container C. Assuming that the piston 56 in cylinder 55 (Fig. 2) is in its uppermost position, to lower the manipulator 61, it is merely necessary to actuate the solenoid-operated valve 447 shown in Fig. 12. As a result, a passageway for fluid will be provided from port 58 of cylinder 55, through lines 439 and 446, valve 447 to the main return line 435, the valve 442 closing communication between the main feed line 346 and such port. By reason of the weight of the manipulator unit, the piston 56 will move downwardly by reason of gravity, the fluid below the piston escaping therefrom through port 58. When the manipulator has been lowered the desired amount, the valve 447 is released, thereby stopping further flow of fluid from the port 58 of the manipulator and restraining further downward movement of the piston and such manipulator.

Assuming that the clamp jaws 332 are in the dot and dash position, shown in Fig. 9, and straddle the container C, they may be moved together to grip such container in the following manner. The solenoid-operated valves 382 and 388 are actuated (Fig. 12) so that fluid will flow through line 381 to the associated port 132 (Fig. 3), passageway 131, the related bore 127, 128, etc., line 134, connected thereto, annular groove 136 which forms a rotary connection with passageway 134 in the manifold 105, lines 292, 297 through the annular groove 245 (Fig. 5) and passageway 283 in pivot pin 237 which also form a rotary connection, thence through axial passageway 281 in rod 282, through the rotary connection formed by annular groove 276, through passageway 272 into port 269 to force the piston 265 downwardly in chamber 264. The fluid on the other side of the piston 265 will pass through port 268, passageways 271 and 273, passageway 279 in rod 232, passageway 282 in pivot pin 236, passageway 286, line 291 (Fig. 3) through the associated transverse passageway 134 in the manifold 105 into the associated bores 127, 128, etc., 131 to the associated port 132 to which is connected the line 379 (Fig. 12) and thence through such line and open valve 388 to the main return line 345, the valve 378 being closed at this time to cut off the supply of fluid from the feed line 346. It is of course obvious that the piston 265 can be lifted by actuating the solenoid-operated valve 378 so that fluid will flow through line 379 into port 268 and from port 269 through line 381 and valve 394 to the return line 245.

Referring to Figs. 4 and 9, when the piston 265 moves downwardly, the piston rod 266 mounted thereon and the actuating member 311 will also move downwardly so that the inclined surfaces of the wedge shaped portion 336 of actuating member 311 will move the rollers 331 on links 326 apart to move the jaws 332 together, thereby securely gripping the container C. By reason of the conformation of the actuating member 311 and the precise movement possible of the piston 265 by reason of the valves controlling flow of fluid to the chamber 264, pressures over a considerable range from practically zero pressure to pressures in the order of 250 pounds or more may be exerted against the container.

After the container has been gripped, it may, if desired, be rotated. For this purpose, for example, the arm 99 may be rotated by the actuation of hydraulic motor 66. The motor 66 is actuated by means of solenoid-operated valve 427 (Fig. 12) which will permit flow of fluid from the main feed line 346 into the hydraulic motor, the direction of the rotation of the motor 66 being determined by which of the push buttons of the valve 427 is actuated. When motor 66 is actuated, referring to Figs. 3 and 5, the shaft 67 and worm 68 thereon will rotate worm gear 69 and shaft 71 so that the worm 78 at the end of shaft 71 will rotate the worm gear 79 and the shaft 81 to which it is affixed. As a result, the pinion 84 at the end of the shaft 81 will rotate gear 85 and also rotate the disc 95 affixed thereto which carries the arm 99 and gripping tool 301 which grips the container C, the bearings 96 and 114 providing ready rotation of the manifold member 105 which is affixed to disc 95 about the cylindrical extension 87. As previously described, by reason of the worm and worm gears utilized, as well as the hydraulic motor, precise movement is possible.

If it is desired to tilt the container C gripped by the gripping tool 301, the elbow 226 (Fig. 4) may be pivoted by the actuation, by the operator, of the appropriate button of solenoid-operated valve 413 so that as previously described, fluid may flow from the main feed line 346 into one or the other of ports 418, 419 of hydraulic motor 213, depending upon whether the elbow 226 is in vertical position and it is desired to pivot it upwardly or is tilted upwardly from vertical position and it is desired to tilt it downwardly. Referring to Figs. 3, 4 and 8 when the hydraulic motor 212 was actuated, through the pinion 212 and gear 211, the shaft 208 will rotate to effect rotation of the worm 207 thereon at its lower end. Worm 207 will rotate worm gear 206 on shaft 204 to rotate the worm 203 and the worm gear 202 affixed thereto which is rigidly connected to sleeve 188, as shown in Fig. 4. As a result sleeves 188 and 217 will rotate as will the gear conformation 222 at the lower end of sleeve 217 to rotate the gear 244 affixed to the yoke arm 231 of the elbow 226, thereby pivoting such elbow about pivot pins 236 and 237 in the desired direction, depending upon which of the ports of the hydraulic motor 213 the fluid pressure supply is connected.

After the elbow has pivoted to the desired position, it may be desired to tilt the container gripped by the gripping tool 301. To this end the wrist member 226 at the lower end of the elbow may be rotated in either direction by the actuation of the appropriate push button of solenoid-operated valve 398 (Fig. 12) so that fluid will flow into one or the other of the ports 404, 405 of the hydraulic motor 171, depending upon the desired direction of rotation of the wrist 227. When hydraulic motor 171 is actuated, through pinion 168 and gear 167, the shaft 165 shown in Fig. 3 will also be rotated as will be the worm 164 affixed thereon. The worm 164 engages a worm gear 163 affixed on shaft 161 to rotate the latter and such shaft mounts a worm 159 which engages worm gear 158 affixed on vertical shaft 154 to rotate such shaft. The shaft 154 is keyed at its lower end to the gear 179 of the internal differential unit 146 and through gears 182 and 183, the gear 185 affixed on shaft 186 will be rotated. Thus, the gear 224 at the lower end of shaft 186 will be rotated to rotate the gear 246 (Fig. 4) rotatably mounted on pivot pin 237 and the gear 248 engaged thereby to rotate the wrist member 227.

It is to be noted that as the elbow is pivoted, as above described, the gear 248 (Fig. 4) would tend to ride over the gear 246 and if such gear should be locked the wrist member would rotate even if the motor 171 was not actuated.

Such undesired rotation of the wrist member is however, prevented by the double differential unit 145 previously described.

Thus, as the elbow 226 is pivoted under the drive imparted thereto by the rotation of gear 222 on sleeve 217, the gear 198 (Fig. 3) will also rotate. As the opposed gear 176 is fixed to arm 99, the gears 194, 195

(Fig. 7) will rotate around such gear 176 causing the hub 180 to rotate. This will carry the gears 182, 183 of the inner differential unit 146 around gear 179 which is connected to the motor 171 and hence is fixed as for purpose of this explanation the motor 171 is not actuated. As a result, the gear 185 will be rotated to drive shaft 186 (Fig. 3) and rotate gear 224 (Fig. 4) so that gear 246 will also be rotated.

As the gear 248 which engages gear 224 is being moved by the pivoting of the elbow, due to the rotation of gear 246, there will be no relative movement between gears 246 and 248 and hence no rotation will be imparted to the wrist member 227.

With the construction above described, seven separate and distinct motions can be performed, singly or simultaneously, without any one of the motions having any effect on any other. These motions are the following: (a) longitudinal by reason of the movement of the bridge 24 along the rails 22; (b) transverse by reason of the movement of the trolley 30 along the bridge 24; (c) vertical by reason of the vertical movement of the piston rod or ram 57; (d) upper arm rotation; (e) pivoting of the elbow in a clockwise or counterclockwise direction; (f) wrist rotation; and (g) tool action by reason of the movement of the double acting hydraulic piston 265.

By reason of the versatility of the manipulator, it achieves substantially the dexterity of the human hand and is ideal for the handling of radioactive and highly toxic materials and dangerous chemicals as the operator remains safe in a protected area and can perform complex operations involving many different steps.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. In a unit of the character described comprising a pair of spaced parallel rails rigidly mounted above the floor of a chamber, a bridge structure extending transversely across said rails and mounted thereon so as to move between the ends of said rails, a trolley mounted on said bridge structure so as to move along the length thereof transversely between said rails, a vertical member mounted on said trolley and depending therefrom below said bridge, means carried by said trolley to effect veritcal movement of said vertical member and means for mounting a tool at the lower end of said members; the combination therewith of drive means mounted on said trolley to effect movement of said bridge along said rails and to effect movement of said trolley along said bridge and means carried by said member to effect actuation of such tool.

2. The combination recited in claim 1 in which said bridge has a pair of wheels at each end riding on said rails, a bridge drive shaft extending the length of said bridge between the ends thereof is connected at each end to an associated pair of wheels, said bridge comprising a pair of spaced parallel rails extending between said first named rails, said trolley having a pair of wheels at each end riding on the rails of said bridge, a trolley drive shaft connected to an associated pair of trolley wheels, a drive member is splined to said bridge drive shaft to rotate therewith and is slidably movable along the length thereof, and a drive member is mounted on said trolley drive shaft, the drive means for said bridge and said trolley comprises a pair of drive motors mounted on said trolley to move therewith, one of said motors being operatively connected to the drive member on said bridge drive shaft and the other of said motors being operatively connected to the drive member on said trolley drive shaft, said bridge drive motor and the drive member on said bridge drive shaft being connected in manner such that upon movement of said trolley along said bridge rails, the drive member on said bridge drive shaft will slide along the latter.

3. A manipulator unit comprising a support, a member rotatably mounted on said support, means carried by said support to effect rotation of said member, a member pivotally mounted on said rotatable member on an axis at right angles to the axis of rotation thereof, means carried by said rotary member to effect pivotal movement of said pivotally mounted member, a second rotary member mounted on said pivotal member on an axis at right angles thereto, means to effect rotation of said second rotary member, a tool mounting means carried by said second rotary member and means carried by said first rotary member to prevent interaction between said pivotal member and said second rotary member.

4. A manipulator unit comprising a support, a drive member rotatably mounted with respect to said support, a motor on said support, a transmission from said motor to said drive member to rotate the latter, an arm rigidly mounted with respect to said drive member to be rotated thereby and extending at right angles to the plane of rotation thereof, an elbow member pivoted to said arm at its lower end on an axis at right angles to said arm, a gear affixed to said elbow member and lying in a plane at right angles to the pivotal mount of said elbow member, a wrist member rotatably mounted at the free end of said elbow member on an axis at right angles to the pivotal mount of the latter, a gear rigid with said wrist member, a second gear meshing with said wrist gear and extending parallel to said elbow gear and rotatably mounted with respect to the latter, a pair of motors carried by said arm and transmissions from said motors to said elbow gear and said second gear to move said elbow about its pivot and to rotate said wrist member, a differential unit included in each of the transmissions from said motors to the elbow gear and second gear, and a tool mounting means carried by said wrist member.

5. A manipulator unit comprising a support, a drive member rotatably mounted with respect to said support, a motor on said support, a transmission from said motor to said drive member to rotate the latter, an arm rigidly mounted with respect to said drive member to be rotated thereby and extending at right angles to the plane of rotation thereof, an elbow member pivoted to said arm at its lower end on an axis at right angles to said arm, a gear affixed to said elbow member and lying in a plane at right angles to the pivotal mount of said elbow member, a wrist member rotatably mounted at the free end of said elbow member on an axis at right angles to the pivotal mount of the latter, a gear rigid with said wrist member, a second gear meshing with said wrist gear and extending parallel to said elbow gear and rotatably mounted with respect to the latter, a pair of motors carried by said arm and transmissions from said motors to said elbow gear and said second gear to move said elbow about its pivot and to rotate said wrist member, a pair of differential units included in said transmissions, one of said units encompassing the other, all the gears of the inner unit being rotatable, and one of the gears of the outer unit being fixed with respect to said arm, and a tool mounting means carried by said wrist member.

6. A manipulator unit comprising a support, a drive member rotatably mounted with respect to said support, a motor on said support, a transmission from said motor to said drive member to rotate the latter, an arm rigidly mounted with respect to said drive member to be rotated thereby and extending at right angles to the plane of rotation thereof, an elbow member pivoted to said arm at its lower end on an axis at right angles to said arm, a gear affixed to said elbow member and lying in a plane at right angles to the pivotal mount of said elbow member, a wrist member rotatably mounted at the free end of said elbow member on an axis at right angles to the pivotal mount of the latter, a gear rigid with said wrist member, a second gear meshing with said wrist gear and extending parallel to said elbow gear and rotatably mounted with respect to the latter, a pair of motors carried by said arm and transmissions from said motors to said elbow gear and said second gear to move said elbow about its pivot and to rotate said wrist member, the transmission to the second gear including a shaft driven by one of said motors, a second shaft having a gear thereon meshing with said second gear to rotate the wrist member, a differential unit, said two shafts being connected respectively to the two opposed gears of said differential unit, the transmission to said elbow gear including a sleeve driven by the other of said motors, encompassing said second shaft and having a gear at one end meshing with said elbow gear to rotate the latter, a second differential unit encompassing the first differential unit, said sleeve having a gear at its other end forming one of the elements of said second differential unit, the opposed gear being fixed with respect to said arm, and a tool mounting means carried by said wrist member.

7. The combination set forth in claim 6 in which a hub is provided having a bore into which each of said two shafts extends, said hub having four radiating stud shafts, spaced 90 degrees apart, two of the diametrically opposed stud shafts each mounting a gear, which meshes with the two opposed gears mounted on said two shafts, the two other diametrically opposed stud shafts each mounting a gear which meshes with the gear at the other end of said sleeve and with the fixed gear.

8. The combination set forth in claim 4 in which the motors in said arm are hydraulic, said support has a substantially cylindrical axial extension, a manifold member rigid with said arm encompasses the lower portion of said extension and is coaxial therewith, said extension having a plurality of longitudinal bores therethrough, and having a plurality of passageways through the upper portion thereof leading into said bores respectively and a plurality of passageways in the lower portion leading from the bores respectively to the outer periphery of said extension, said manifold having a plurality of passageways associated respectively with each of the passageways in the lower portion of said extension, a rotary connection between the associated passageways in said lower portion of said extension and said manifold, means to connect a hydraulic system to the plurality of passageways in the upper portion of said extension and means to connect the motors in said arm to the plurality of passageways in said manifold.

9. The combination set forth in claim 8 in which the rotary connection comprises an annular groove in the periphery of said extension in communication with the associated passageway in the lower portion of said extension and aligned with the associated passageway in said manifold.

10. The combination set forth in claim 8 in which the rotary connection comprises an annular groove in the periphery of said extension in communication with the associated passageway in the lower portion of said extension and aligned with the associated passageway in said manifold, said extension having a pair of annular grooves straddling said first annular groove and a resilient seal ring is positioned in each of said pair of annular grooves.

11. A manipulator unit comprising a support, a drive member rotatably mounted with respect to said support, a motor on said support, a transmission from said motor to said drive member to rotate the latter, an arm rigidly mounted with respect to said drive member to be rotated thereby and extending at right angles to the plane of rotation thereof, an elbow member pivoted to said arm at its lower end on an axis at right angles to said arm, a gear affixed to said elbow member and lying in a plane at right angles to the pivotal mount of said elbow member, a wrist member rotatably mounted at the free end of said elbow member on an axis at right angles to the pivotal mount of the latter, a gear rigid with said wrist member, a second gear meshing with said wrist gear and extending parallel to said elbow gear and rotatably mounted with respect to the latter, a pair of motors carried by said arm and transmissions from said motors to said elbow gear and said second gear to move said elbow about its pivot and to rotate said wrist member, a tool mounting means carried by said wrist member, a hydraulic motor in said wrist member to operate the tool carried by said tool mounting means, said arm having a pair of passageways for fluid, means to connect said passageways to said hydraulic motor, said means comprising a pair of transversely aligned pins pivotally mounting said elbow member and affixed at each end in said arm, a passageway in each of said pins, a rotary fluid connection between the passageways in the arm and in said pins, a pair of passageways in said wrist member connected to said hydraulic motor therein, and rotary fluid connections between the passageways in said pin and said wrist member.

12. The combination set forth in claim 8 in which the hydraulic motor in said wrist comprises a chamber, a piston slidable in said chamber, said chamber having a port on each side of the piston to which the pair of passageways in said wrist member are respectively connected, and a piston rod connected to said piston to actuate the tool on said tool mounting means.

References Cited in the file of this patent

UNITED STATES PATENTS

| | | |
|---|---|---|
| 805,038 | Taylor | Nov. 21, 1905 |
| 1,558,746 | Moore | Oct. 27, 1925 |
| 1,729,891 | Moore | Oct. 1, 1929 |
| 1,880,138 | Hubl | Sept. 27, 1932 |
| 2,476,249 | Payne | July 12, 1949 |
| 2,521,832 | Cordivano | Sept. 12, 1950 |
| 2,632,574 | Goertz | Mar. 24, 1953 |
| 2,679,940 | Goertz et al. | June 1, 1954 |

FOREIGN PATENTS

| | | |
|---|---|---|
| 174,407 | Austria | Mar. 25, 1953 |